(12) United States Patent
Sato et al.

(10) Patent No.: US 6,751,054 B2
(45) Date of Patent: Jun. 15, 2004

(54) THIN-FILM MAGNETIC HEAD FOR PERPENDICULAR MAGNETIC RECORDING HAVING MAIN MAGNETIC POLE LAYER ON FLAT SURFACE

(75) Inventors: Kiyoshi Sato, Niigata-ken (JP);
Toshinori Watanabe, Niigata-ken (JP);
Toshihiro Kuriyama, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/903,223

(22) Filed: Jul. 11, 2001

(65) Prior Publication Data

US 2002/0006013 A1 Jan. 17, 2002

(30) Foreign Application Priority Data

Jul. 13, 2000 (JP) ........................................ 2000-217249

(51) Int. Cl.$^7$ ............................................... G11B 5/147
(52) U.S. Cl. ........................................................ 360/126
(58) Field of Search .................................... 360/126, 125, 360/317

(56) References Cited

U.S. PATENT DOCUMENTS 4,873,599 A    10/1989   Sueoka
4,943,882 A * 7/1990   Wada et al. ................. 360/126
5,225,953 A    7/1993   Wada et al.
5,991,126 A * 11/1999 Hayashi et al. ............. 360/125

FOREIGN PATENT DOCUMENTS

JP         62-114113        5/1987

* cited by examiner

*Primary Examiner*—Robert S. Tupper
(74) *Attorney, Agent, or Firm*—Brinks Hofer Gilson & Lione

(57) ABSTRACT

A thin-film magnetic head for perpendicular magnetic recording comprising an auxiliary magnetic pole layer; a main magnetic pole layer; a conductive coil layer in a spiral shape which is disposed between the main magnetic pole layer and the auxiliary magnetic pole layer and which cross the magnetic circuit; and insulating layers electrically insulating the auxiliary magnetic pole layer and the main magnetic pole layer from the conductive coil layer. The insulating layers have flat surfaces formed at the sides further from the auxiliary magnetic pole layer, the front end portion of the main magnetic pole layer is provided on one of the flat surfaces, and the conductive coil layer is disposed under the main magnetic pole layer so that a part of the conductive coil layer opposes the front end portion of the main magnetic pole layer.

7 Claims, 13 Drawing Sheets

THIN-FILM MAGNETIC HEAD FOR PERPENDICULAR MAGNETIC RECORDING HAVING MAIN MAGNETIC POLE LAYER ON FLAT SURFACE

BACKGROUND OF THE INVENTION

1. Field of the Invention

The present invention relates to thin-film magnetic heads for use in magnetic disc apparatuses, magnetic tape apparatuses, and the like for recording information on magnetic recording media by a perpendicular magnetic recording method.

2. Description of the Related Art

FIGS. 17 to 24 are views for illustrating conventional thin-film magnetic heads for perpendicular magnetic recording. As shown in FIG. 17, a thin-film magnetic head 31 for perpendicular magnetic recording has a structure in which a nonmagnetic layer 33 composed of $Al_2O_3$ and a thick magnetic layer 34 composed of a soft magnetic material such as a Fe—Ni-based alloy (permalloy) are formed on a substrate 32 composed of a nonmagnetic material such as an $Al_2O_3$—TiC ceramic. A thin magnetic layer 35 composed of a soft magnetic material such as a Fe—Ni-based alloy is formed on the nonmagnetic layer 33 and the thick magnetic layer 34. An insulating layer 36 composed of an inorganic insulating material and a conductive coil layer 37 in a spiral shape composed of a low-resistance conductive material such as Cu are sequentially formed in this order on the thin magnetic layer 35. An insulating layer 38 composed of an inorganic insulating material is formed on the insulating layer 36 so as to cover the conductive coil layer 37, and an auxiliary magnetic pole layer 39, composed of a soft magnetic material such as a Fe—Ni alloy, is formed on the insulating layer 38 and is magnetically coupled with the thin magnetic layer 35 at the back end portion thereof.

In addition, the thick magnetic layer 34 and the thin magnetic layer 35 form a main magnetic pole layer 40. The individual front end surfaces of the substrate 32, the nonmagnetic layer 33, the thin magnetic layer 34, the insulating layers 36 and 38, and the auxiliary magnetic pole layer 39 form a medium-opposing surface 41 which opposes a magnetic recording medium 42. As shown in FIG. 18, a narrow width of a front end portion 35a of the thin magnetic layer 35 formed on the nonmagnetic layer 33 has a track width Tw.

As shown in FIG. 17, the magnetic recording medium 42, on which information is recorded by the thin-film magnetic head 31 for perpendicular magnetic recording, has a multilayer structure composed of a substrate 43 and a perpendicular magnetizing layer 45, with a soft magnetic layer 44 having high permeability provided therebetween.

In the structure of the thin-film magnetic head 31 for perpendicular magnetic recording and the magnetic recording medium 42 shown in FIG. 17, when a recording current is applied to the conductive coil layer 37, magnetic flux is generated in accordance with the recording current, and the magnetic flux flows in a magnetic circuit formed of the auxiliary magnetic pole layer 39, the main magnetic pole layer 40, the perpendicular magnetizing layer 45, and the soft magnetic layer 44 having high permeability. This magnetizes the perpendicular magnetizing layer 45 of the magnetic recording medium 42 at a part thereof opposing the end surface of the thin magnetic layer 35 of the main magnetic pole layer 40, whereby information is recorded on the magnetic recording medium 42.

The thin-film magnetic head 31 for perpendicular magnetic recording is manufactured by, as shown in FIG. 19, first forming the thick magnetic layer 34 by electroplating on the substrate 32 other than an area from the edge to a slightly inner side thereof, and, as shown in FIG. 20, then forming the nonmagnetic layer 33 on the thick magnetic layer 34 and on the substrate 32 at which the thick magnetic layer 34 is not formed. Subsequently, as shown in FIG. 21, the nonmagnetic layer 33 and the thick magnetic layer 34 are polished by a chemical mechanical polishing method (hereinafter referred to as a CMP method) so that the nonmagnetic layer 33 and the thick magnetic layer 34 have the same thickness.

Next, as shown in FIG. 22, on the nonmagnetic layer 33 and the thick magnetic layer 34, the thin magnetic layer 35 is formed by sputtering, and as shown in FIG. 23, the insulating layer 36 is then formed on the thin magnetic layer 35. On the insulating layer 36, an underlying layer for plating (not shown) and a resist layer 46 are sequentially formed. Subsequently, a pattern 46a corresponding to the conductive coil layer 37 is formed in the resist layer 46 by a photolithographic technique, and electroplating is then performed thereon to thereby form the conductive coil layer 37 on the insulating layer 36.

Next, as shown in FIG. 24, the resist layer 46 and the underlying layer for plating are removed. The insulating layer 38 is then formed on the insulating layer 36 so as to cover the conductive coil layer 37, and the auxiliary magnetic pole layer 39 is formed on the insulating layer 38 by using an electroplating method and a photolithographic technique, whereby the thin-film magnetic head 31 for perpendicular magnetic recording is formed.

In the conventional thin-film magnetic head 31 for perpendicular magnetic recording described above, the insulating layer 36 must be formed flat before the conductive coil layer 37 is formed by a photolithographic technique. The nonmagnetic layer 33 and the thick magnetic layer 34, whose shapes influence the shape of the insulating layer 36, are therefore planarized by polishing using a CMP method. However, due to variations in machining accuracy, the thick magnetic layer 34 constituting the main magnetic pole layer 40 may be polished by more than a predetermined amount. As a result, when a recording current is applied to the conductive coil layer 37, the main magnetic pole layer 40 may be placed in a state of magnetic flux saturation, thereby decreasing the amount of magnetic flux concentrated on the front end portion 35a of the thin magnetic layer 35 constituting the main magnetic pole layer 40. As a result, a problem may arise in that information cannot be recorded on the magnetic recording medium 42.

In addition, and as shown in FIG. 17, since distance A between the conductive coil layer 37 and the front end portion 35a of the main magnetic pole layer 40 is relatively long, it is difficult to ensure sufficient magnetic flux concentrated on the front end surface of the thin magnetic layer 35 of the main magnetic pole layer 40. As a result, a problem may arise in that the magnetic efficiency of the magnetic circuit described above is decreased. The problem described above can be solved by decreasing the distance A and by providing a part of the conductive coil layer 37 on a part of the insulating layer 36 corresponding to the front end portion 35a of the thin magnetic layer 35. However, since the part of the insulating layer 36 mentioned above has a step portion 36a in conformity with the shape of the front end portion 35a of the thin magnetic layer 35, when the pattern 46a is formed in the resist layer 46 by a photolithographic technique, light exposing the resist layer 46 reflects diffusely at the step portion 36a, and the pattern 46a is distorted, whereby the cross-sectional shape and the intervals of the conductive coil layer 37 are damaged. As a result, the characteristics of information recording on the magnetic recording medium 42 are adversely influenced.

SUMMARY OF THE INVENTION

The present invention was made in view of the problems of the conventional thin-film magnetic heads described above. An object of the present invention is to provide a thin-film magnetic head for perpendicular magnetic recording, which can concentrate sufficient magnetic flux for recording on an front end portion of a main magnetic pole layer when recording is performed, and which has a magnetic circuit having superior magnetic efficiency.

To these ends, a thin-film magnetic head for perpendicular magnetic recording of the present invention comprises an auxiliary magnetic pole layer having a front end portion opposing a magnetic recording medium; a main magnetic pole layer having a front end portion opposing the front end portion of the auxiliary magnetic pole layer with a spacing therebetween and having a back end portion magnetically coupled therewith so as to form a magnetic circuit together with the auxiliary magnetic pole layer; a conductive coil layer formed in a spiral shape; and insulating layers electrically insulating the auxiliary magnetic pole layer and the main magnetic pole layer from the conductive coil layer; wherein at least one of the insulating layers has a flat surface, the front end portion of the main magnetic pole layer is provided on the flat surface, and a part of the conductive coil layer is disposed between the front end portion of the main magnetic pole layer and the auxiliary magnetic pole layer.

In the structure described above, the main magnetic pole layer comprises a narrow front magnetic pole member forming the front end portion; and a yoke member in contact with a back end part of the front magnetic pole member, the yoke member having a width larger than that of the front magnetic pole member; wherein a back end part of the yoke member is magnetically coupled with the auxiliary magnetic pole layer.

In addition, in the structure described above, the thin-film magnetic head further comprises a coupling magnetic layer formed on the auxiliary magnetic pole layer, wherein the back end part of the yoke member is formed on an upper surface, which is flush with the flat surface of the coupling magnetic layer, and the main magnetic pole layer is magnetically coupled with the auxiliary magnetic pole layer by the coupling magnetic layer.

Furthermore, in the structure described above, at least one of the insulating layers comprises a first insulating layer having the flat surface, and a second insulating layer provided on the flat surface of the first insulating layer. The conductive coil layer comprises a first coil member penetrating the first insulating layer, and a second coil member, which is formed on the flat surface and is connected to a wire extending from the center of the first coil member, penetrating the second insulating layer.

In addition, in the structure described above, the auxiliary magnetic pole layer is also used as an upper shield layer of a magnetoresistive head for reproducing information from the magnetic recording medium.

DESCRIPTION OF THE PREFERRED EMBODIMENTS

Hereinafter, the embodiments of a thin-film magnetic head for perpendicular magnetic recording of the present invention will be described with reference to FIGS. 1 to 12, which is, by way of example, provided with a magnetoresistive head reproducing information from a magnetic recording medium.

Figure 1:
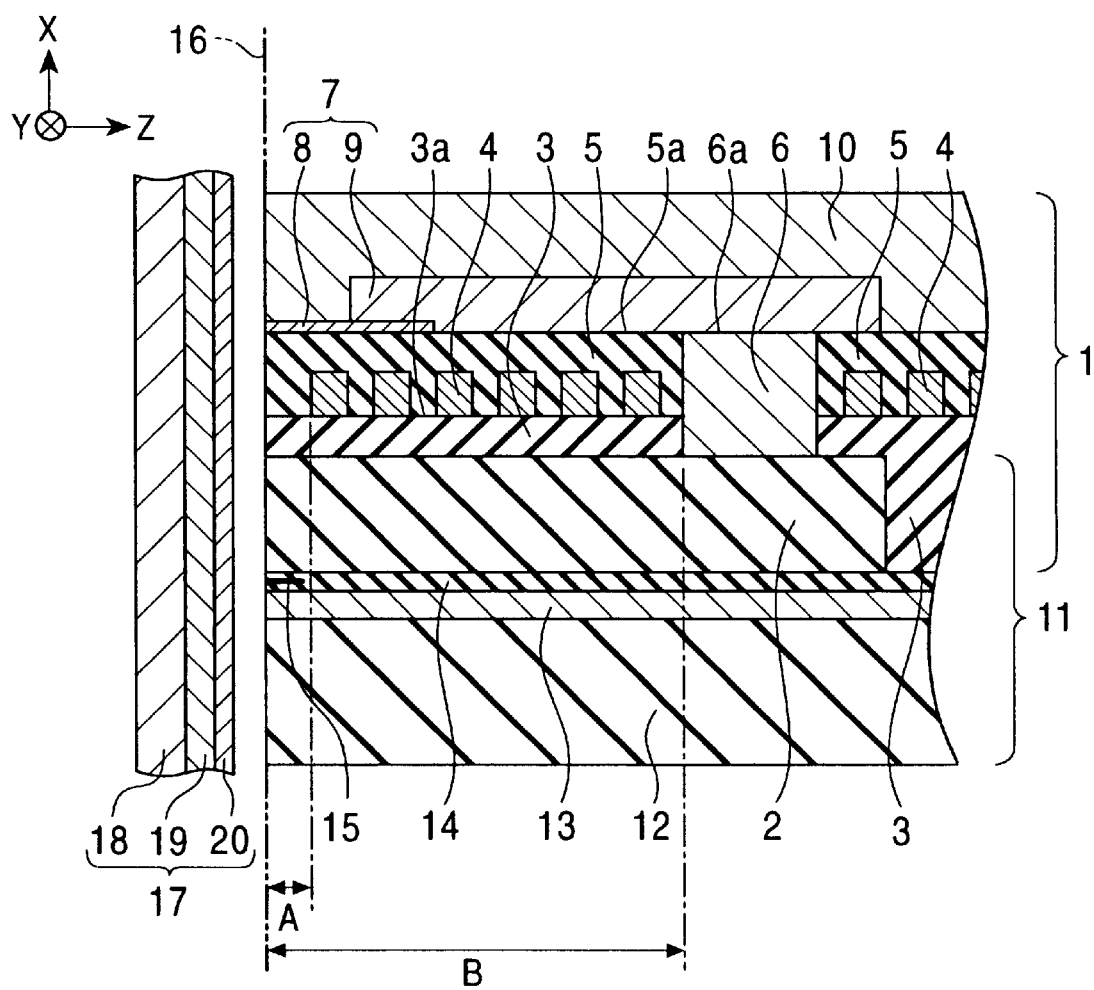
FIG. 1 is a cross-sectional view of a thin-film magnetic head for perpendicular magnetic recording of the present invention.

As shown in FIG. 1, a magnetoresistive head 11 comprises a lower shield layer 13, composed of a soft magnetic material such as a Fe—Ni alloy (permalloy), formed on a substrate 12 composed of a nonmagnetic material such as an $Al_2O_3$—TiC ceramic; an upper shield layer 2 which opposes the lower shield layer 13 and which is also used as an auxiliary magnetic pole layer for a thin-film magnetic head 1 for perpendicular magnetic recording; and a rectangular magnetoresistive element 15 formed in a nonmagnetic insulating layer 14 disposed between the upper and the lower shield layers 2 and 13. In addition, the end surfaces of the individual front end portions of the upper and the lower shield layers 2 and 13, the nonmagnetic insulating layer 14, and the magnetoresistive element 15 form a medium-opposing surface 16 opposing a magnetic recording medium 17.

In addition, a thin-film magnetic head 1 provided with the magnetoresistive head 11 comprises an auxiliary magnetic pole layer 2; an insulating layer 3 formed on the auxiliary magnetic pole layer 2 and the nonmagnetic insulating layer 14; a coupling magnetic layer 6 formed on the auxiliary magnetic pole layer 2; a conductive coil layer 4 in a spiral shape formed on the insulating layer 3 so as to surround the coupling magnetic layer 6; an insulating layer 5 formed on the insulating layer 3 so as to cover the conductive coil layer 4; a main magnetic pole layer 7 which is formed on the insulating layer 5, which is disposed above the auxiliary magnetic pole layer 2, and which is magnetically coupled with the auxiliary magnetic pole layer 2 by the coupling magnetic layer 6; and a protecting layer 10 formed on the insulating layer 5 so as to cover the main magnetic pole layer 7. End surfaces of the individual front end portions of the auxiliary magnetic pole layer 2, the insulating layers 3 and 5, the main magnetic pole layer 7, and the protecting layer 10 form the medium-opposing surface 16 opposing the magnetic recording medium 17.

In addition, the magnetic recording medium 17 described above, which records information thereon and reproduces information therefrom by the thin-film magnetic head 1 for perpendicular magnetic recording and the magnetoresistive head 11, has a multilayer structure composed of a substrate 18, a perpendicular magnetizing layer 20, and a soft magnetic layer 19 having high permeability provided therebetween.

Next, individual layers forming the thin-film magnetic head 1 for perpendicular magnetic recording will be described in detail.

The auxiliary magnetic pole layer 2 is composed of a soft magnetic material such as a Fe—Ni alloy (permalloy), functions as a magnetic flux return yoke for returning magnetic flux radiating from the main magnetic pole layer 7 thereto, and serves to prevent the magnetoresistive element 15 from being influenced by a magnetic field other than a leakage magnetic field from the magnetic recording medium 17.

The insulating layer 3 electrically insulates the conductive coil layer 4 formed on the flat surface 3a thereof from the auxiliary magnetic pole layer 2, and is composed of an inorganic insulating material such as $Al_2O_3$.

The conductive coil layer 4 is composed of a low-resistance conductive material such as copper (Cu), is formed on the flat surface 3a of the insulating layer 3 so as to be disposed between the auxiliary magnetic pole layer 2 and the main magnetic pole layer 7, and crosses the magnetic circuit formed of the auxiliary magnetic pole layer 2, the coupling magnetic layer 6, the main magnetic pole layer 7, and the perpendicular magnetizing layer 20, and the soft magnetic layer 19 having high permeability.

The insulating layer 5 is composed of an inorganic insulating layer such as $Al_2O_3$, has a flat surface 5a at the side further from the auxiliary magnetic pole layer 2, and insulates the main magnetic pole layer 7 formed on the flat surface 5a from the conductive coil layer 4.

The coupling magnetic layer 6 is composed of a soft magnetic material such as a Fe—Ni alloy, is formed on the auxiliary magnetic pole layer 2 so as to penetrate the insulating layers 3 and 5, magnetically couples the back end portion of the main magnetic pole layer 7 with the back end portion of the auxiliary magnetic pole layer 2, and has an upper surface 6a, which is flush with the flat surface 5a of the insulating layer 5, at the side further from the auxiliary magnetic pole layer 2.

The main magnetic pole layer 7 is composed of a soft magnetic material such as a Fe—Ni alloy, and comprises a narrow front magnetic pole member 8 forming the front end portion of the main magnetic pole layer 7 and a yoke member 9 in contact with the back end part of the front magnetic pole member 8, in which the front magnetic pole member 8 formed on the flat surface 5a of the insulating layer 5 opposes the front end portion of the auxiliary magnetic pole layer 2 with a spacing therebetween in the extending direction of the track of the magnetic recording medium 17, and the back end part of the yoke member 9 is disposed on the flat surface 6a of the coupling magnetic layer 6.

The protecting layer 10 is composed of an inorganic insulating material such as $Al_2O_3$ so as to prevent the individual layers of the thin-film magnetic head 1 for perpendicular magnetic recording from being corroded.

Next, a method for manufacturing the above-described thin-film magnetic head 1 for perpendicular magnetic recording will be described.

Figure 3:
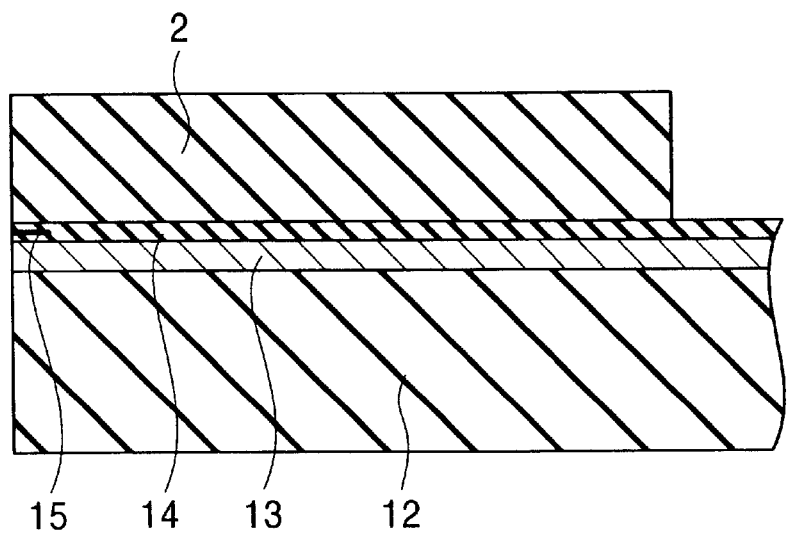
FIG. 3 is a cross-sectional view for illustrating a step in a method for manufacturing a thin-film magnetic head for perpendicular magnetic recording of the present invention showing a state in which an auxiliary magnetic pole layer is formed.
Figure 4:
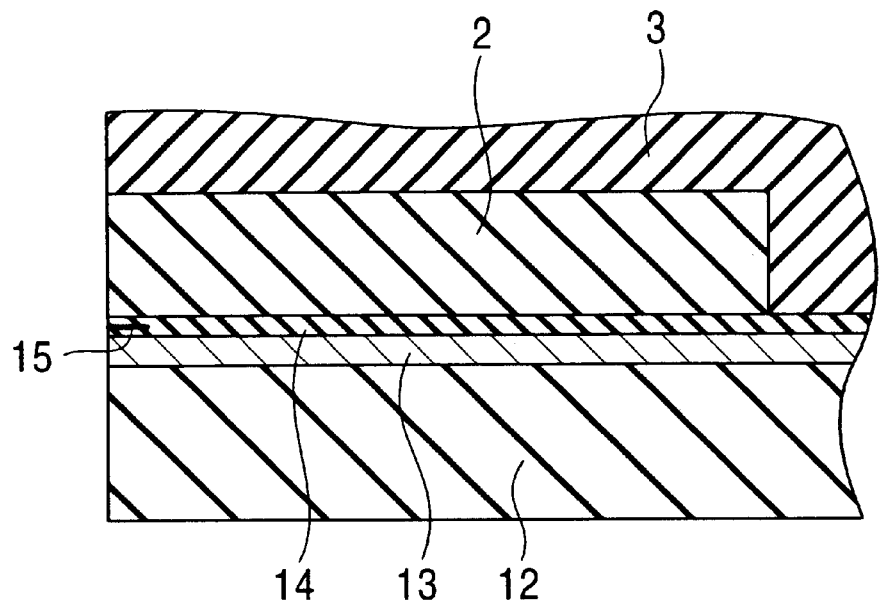
FIG. 4 is a cross-sectional view for illustrating a step in a method for manufacturing a thin-film magnetic head for perpendicular magnetic recording of the present invention showing a state in which an insulating layer is formed.
Figure 5:
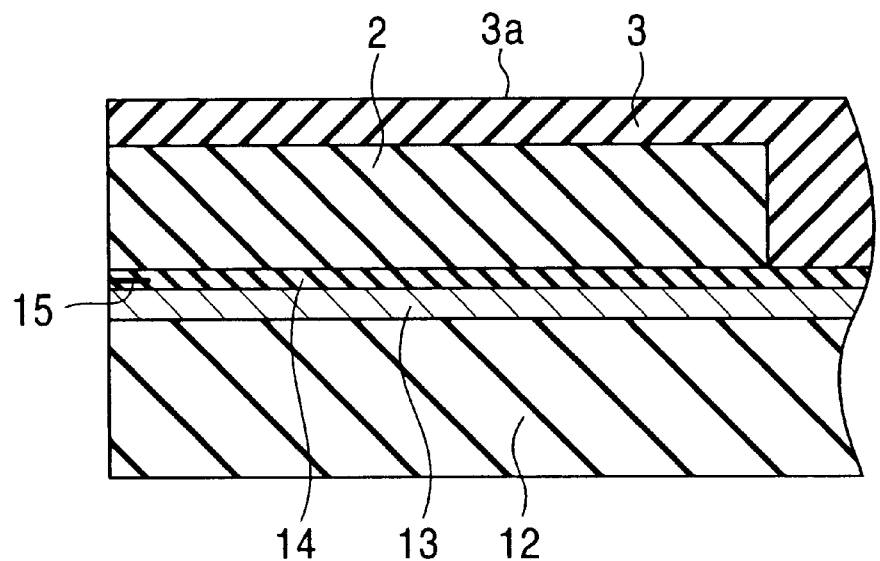
FIG. 5 is a cross-sectional view for illustrating a step in a method for manufacturing a thin-film magnetic head for perpendicular magnetic recording of the present invention showing a state in which an insulating layer is planarized.

First, as shown in FIG. 3, the auxiliary magnetic pole layer 2 is formed by electroplating on the nonmagnetic insulating layer 14, and as shown in FIG. 4, the insulating layer 3 is then formed by a sputtering method on the auxiliary magnetic pole layer 2 and on the nonmagnetic insulating layer 14. As shown in FIG. 5, the insulating layer 3 is polished by a CMP method, thereby forming the flat surface 3a.

Figure 6:
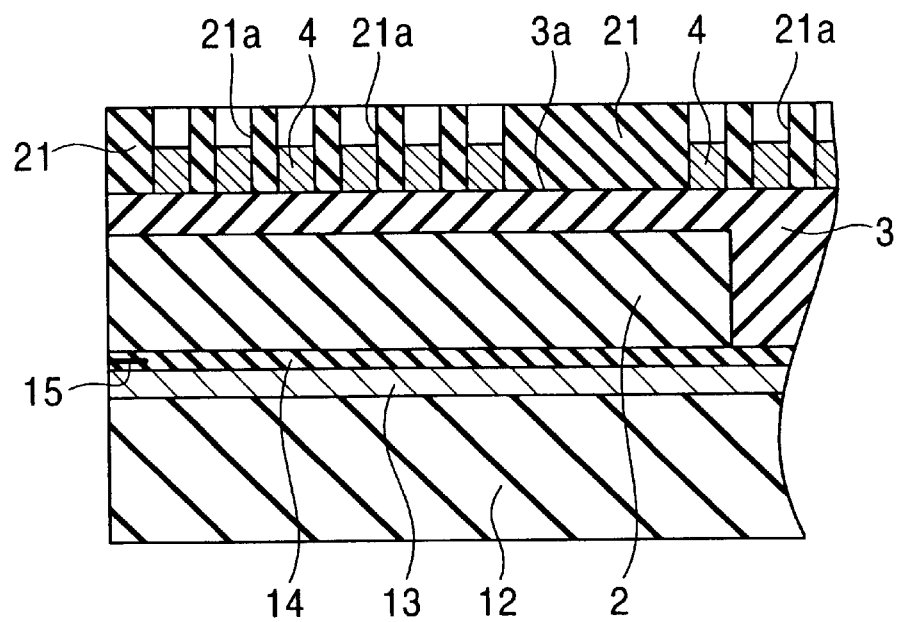
FIG. 6 is a cross-sectional view for illustrating a step in a method for manufacturing a thin-film magnetic head for perpendicular magnetic recording of the present invention showing a state in which a resist layer and a conductive coil layer are formed.

Next, as shown in FIG. 6, the underlying layer for plating (not shown) and the resist layer 21 are sequentially formed on the flat surface 3a of the insulating layer 3, the pattern 21a corresponding to the conductive coil layer 4 is formed in the resist layer 21 by a photolithographic technique, and the conductive coil layer 4 is subsequently formed on the insulating layer 3 by electroplating.

Figure 7:
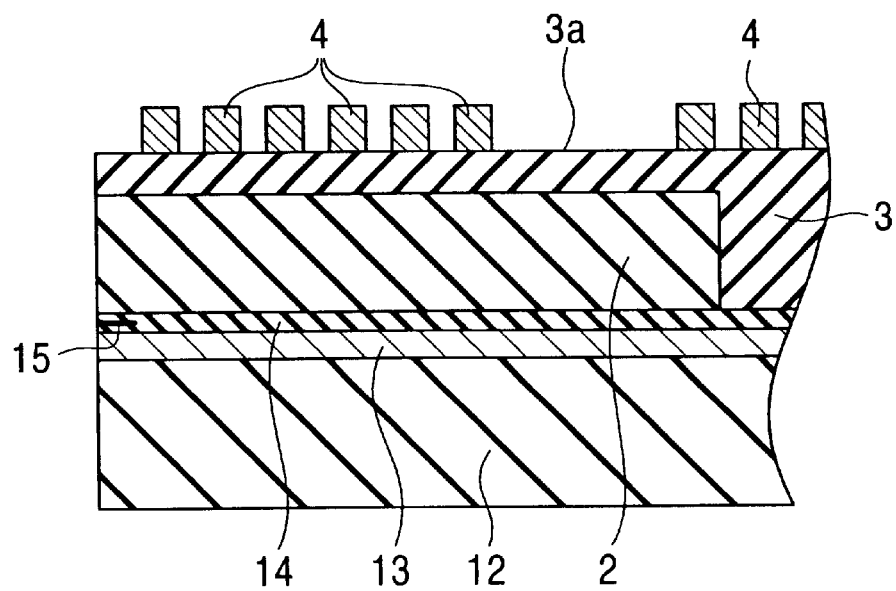
FIG. 7 is a cross-sectional view for illustrating a step in a method for manufacturing a thin-film magnetic head for perpendicular magnetic recording of the present invention showing a state in which a resist layer is removed.
Figure 8:
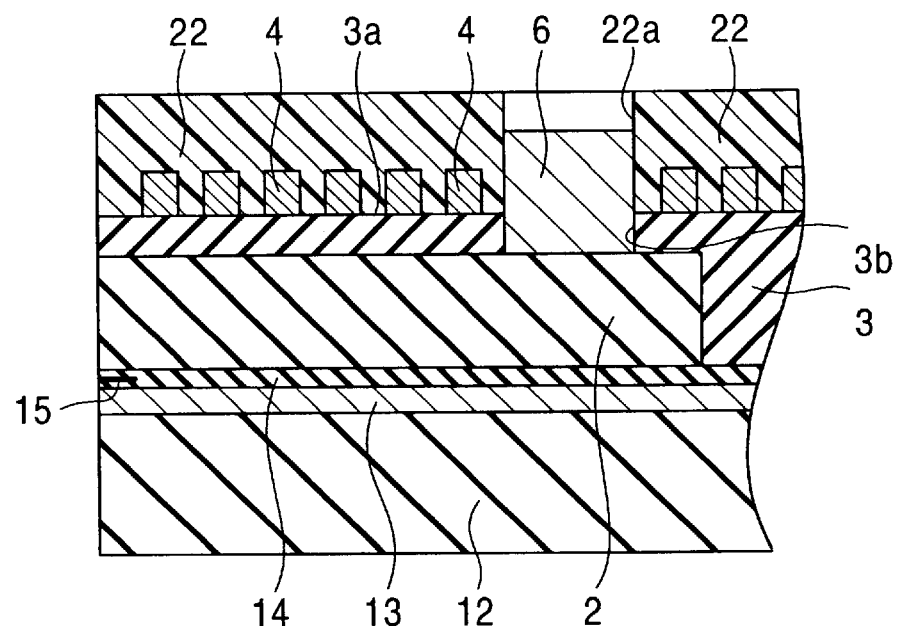
FIG. 8 is a cross-sectional view for illustrating a step in a method for manufacturing a thin-film magnetic head for perpendicular magnetic recording of the present invention showing a state in which a resist layer and a coupling magnetic layer are formed.

Next, after the resist layer 21 and the underlying layer for plating are removed as shown in FIG. 7, a resist layer 22 is formed on the flat surface 3a of the insulating layer 3 so as to cover the conductive coil layer 4 as shown in FIG. 8, a pattern 22a corresponding to the coupling magnetic layer 6 is formed in the resist layer 22 by a photolithographic technique, and in addition, a pattern 3b extending from the pattern 22a is formed in the insulating layer 3 by an ion milling method. Next, electroplating is performed on the patterns 22a and 3b, thereby forming the coupling magnetic layer 6 on the auxiliary magnetic pole layer 2.

Figure 9:
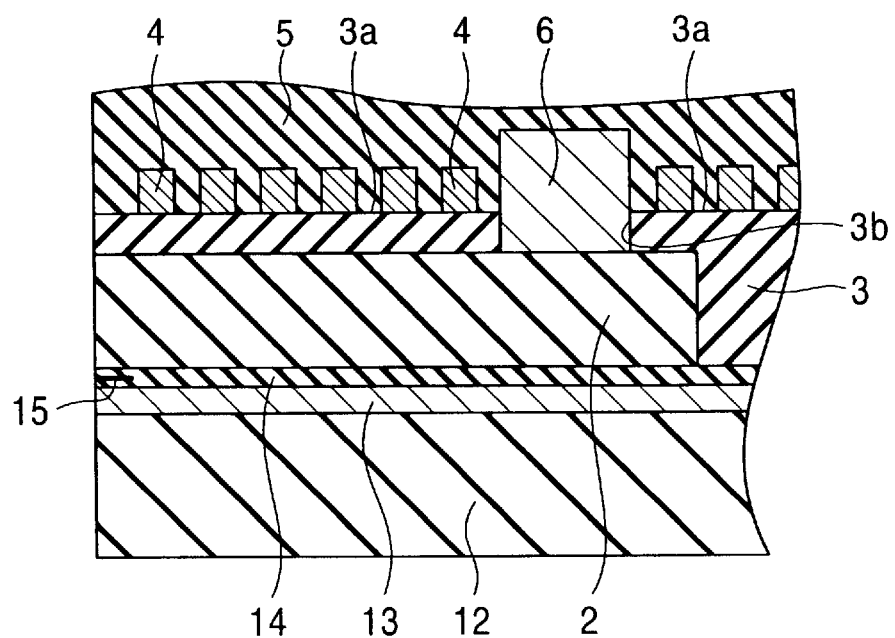
FIG. 9 is a cross-sectional view for illustrating a step in a method for manufacturing a thin-film magnetic head for perpendicular magnetic recording of the present invention showing a state in which an insulating layer is formed.
Figure 10:
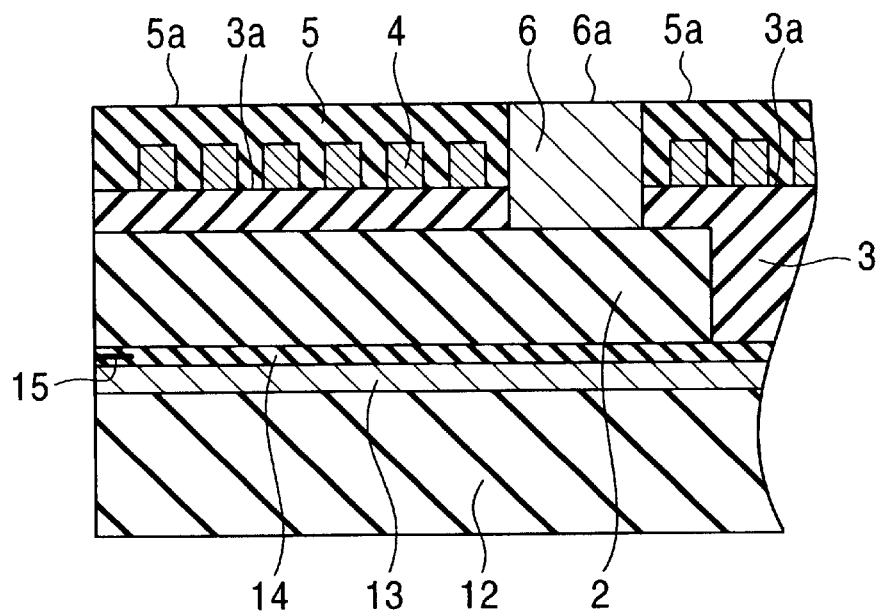
FIG. 10 is a cross-sectional view for illustrating a step in a method for manufacturing a thin-film magnetic head for perpendicular magnetic recording of the present invention showing a state in which an insulating layer is planarized.

As shown in FIG. 9, and after the resist layer 22 is removed, the insulating layer 5 is next formed on the flat surface 3a of the insulating layer 3 so as to cover the conductive coil layer 4 and the coupling magnetic layer 6, and the insulating layer 5 and the coupling magnetic layer 6 are polished by a CMP method, whereby the flat surface 5a of the insulating layer 5 and the flat surface 6a, which is flush therewith and extends therefrom, of the coupling magnetic layer 6 are formed as shown in FIG. 10.

Figure 11:
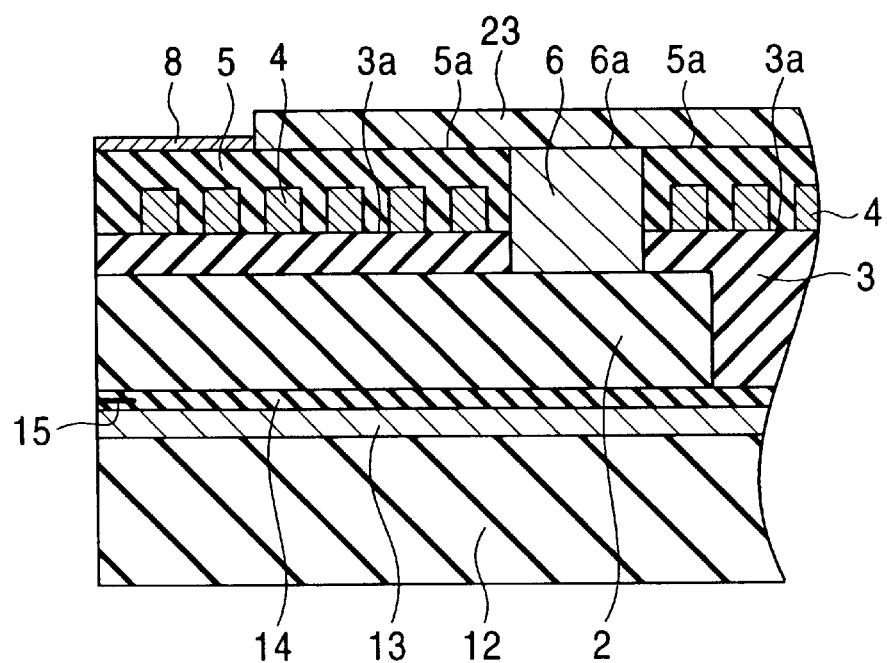
FIG. 11 is a cross-sectional view for illustrating a step in a method for manufacturing a thin-film magnetic head for perpendicular magnetic recording of the present invention showing a state in which a front magnetic pole member of a main magnetic pole layer is formed.

As shown in FIG. 11, an underlying layer for plating (not shown) is subsequently formed on the flat surface 5a of the insulating layer 5 and on the flat surface 6a of the coupling magnetic layer 6, a resist layer 23 is formed by electroplating on the underlying layer for plating other than an area from the edge of the insulating layer 5 to a slightly inner side thereof, and the front magnetic member 8 of the main magnetic pole layer 7 is formed by electroplating.

Figure 12:
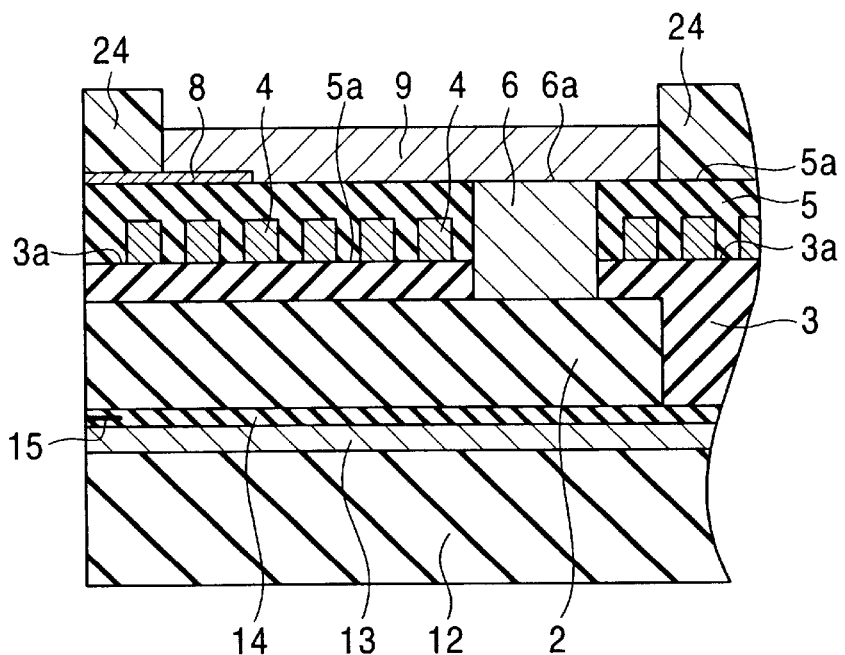
FIG. 12 is a cross-sectional view for illustrating a step in a method for manufacturing a thin-film magnetic head for perpendicular magnetic recording of the present invention showing a state in which a yoke member of the main magnetic pole layer is formed.

After the resist layer 23 is removed, a resist layer 24 is formed on the front magnetic pole member 8 and on the flat surface 5a of the insulating layer 5 as shown in FIG. 12, and the yoke member 9 of the main magnetic pole layer 7 is formed by electroplating.

After the steps described above are performed, the resist layer 24 is removed, and the protecting layer 10 is formed on the main magnetic pole layer 7 and on the flat surface 5a of the insulating layer 5.

Figure 2:
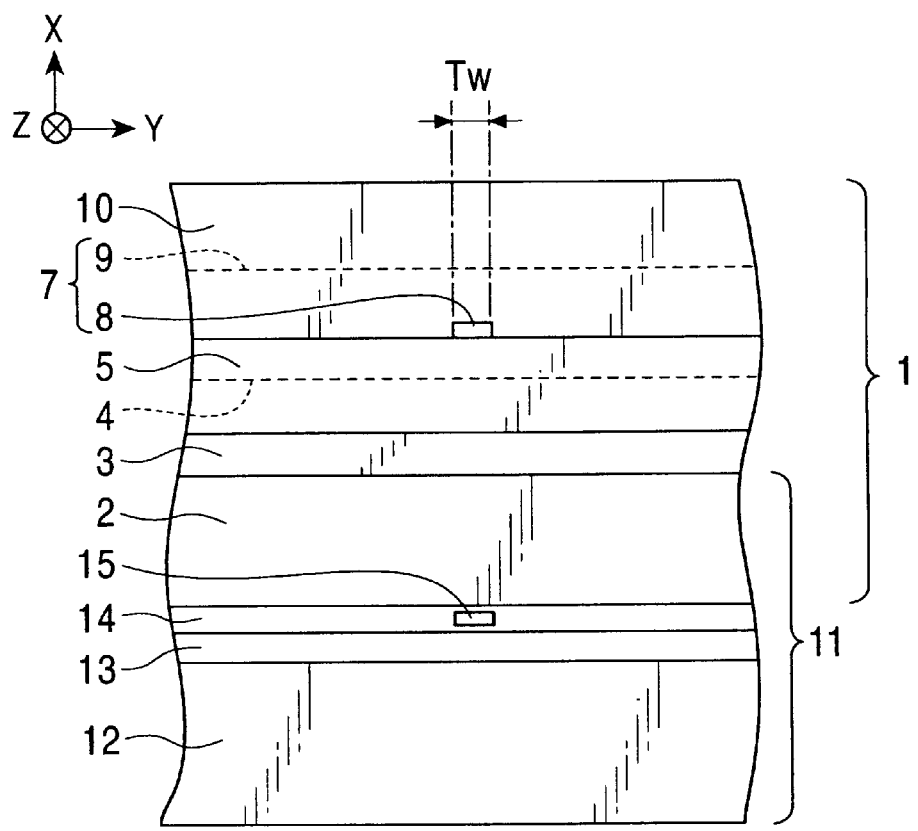
FIG. 2 is a front view of an important portion of a thin-film magnetic head for perpendicular magnetic recording of the present invention, when viewed from a medium-opposing surface.

As has thus been described, the manufacture of the thin-film magnetic head 1 for perpendicular magnetic recording is complete, and by this manufacturing process, the thin-film magnetic head 1 has a structure as shown in FIG. 1 in which the conductive coil layer 4 is disposed below the main magnetic pole layer 7, a part of the conductive coil layer 4 opposes the front magnetic pole member 8 of the main magnetic pole layer 7 in the extending direction (direction indicated by the arrow X) of the track, the width of the front magnetic pole member 8 is defined as the track width Tw as shown in FIG. 2, and the front magnetic pole member 8 is formed narrower than the yoke member 9 in the track width direction (direction indicated by the arrow Y).

In the thin-film magnetic head 1 for perpendicular magnetic recording combined with the magnetoresistive head 11 which is disposed in the direction perpendicular to the perpendicular magnetizing layer 20 (the direction indicated by the arrow Z as shown in FIG. 1), when a recording current is applied to the conductive coil layer 4, magnetic flux is generated in accordance with the recording current, and the magnetic flux flows in the magnetic circuit described above and magnetizes the perpendicular magnetizing layer 20 of the magnetic recording medium 17 at a part thereof opposing the end surface 16 of the front magnetic pole member 8 of the main magnetic pole layer 7. Accordingly, information recording is performed on the magnetic recording medium 17.

That is, the magnetic flux generated by the application of the recording current to the conductive coil layer 4 is radiated from the front magnetic pole member 8 of the main magnetic pole layer 7 and flows so as to return thereto via a path of the perpendicular magnetizing layer 20, the soft magnetic layer 19 having high permeability, the auxiliary magnetic pole layer 2, and the coupling magnetic layer 6 in this order, whereby the perpendicular magnetizing layer 20 of the magnetic recording medium 17 is magnetized, and information recording is performed thereon. In addition, the information thus recorded is reproduced as the change in magnetoresistance of the magnetoresistive element 15 provided in the magnetoresistive head 11.

Accordingly, in the thin-film magnetic head 1 for perpendicular magnetic recording described above, after the auxiliary magnetic pole layer 2, the insulating layer 3, the conductive coil layer 4, the insulating layer 5, and the coupling magnetic layer 6 are successively formed, the main magnetic pole layer 7 is formed on the insulating layer 5 covering the conductive coil layer 4. Hence, the main magnetic pole layer 7 is not influenced by polishing using a CMP method, which must be performed before the conductive coil layer 4 is formed, and a main magnetic pole layer 7 having a predetermined film thickness can always be formed. As a result, the amount of magnetic flux concentrated on the front magnetic pole member 8 can be sufficiently ensured, and hence, information recording on the magnetic recording medium 17 can be reliably performed.

In addition, since the conductive coil layer 4 is disposed below the main magnetic pole layer 7, and the part of the conductive coil layer 4 is opposed to the front magnetic pole member 8 of the main magnetic pole layer 7 in the extending direction (direction indicated by the arrow X in the Figs.) of the track, the distance A between the conductive coil layer 4 and the front magnetic pole member 8 of the main magnetic pole layer 7 is decreased, and the magnetic flux concentrated on the front magnetic pole member 8 of the main magnetic pole layer 7 can be sufficiently ensured. Whereby the magnetic efficiency of the magnetic circuit, which is formed of the auxiliary magnetic pole layer 2, the coupling magnetic layer 6, the main magnetic pole layer 7, the perpendicular magnetizing layer 20, and the soft magnetic layer 19 having high permeability, can be improved.

In addition, in the track width direction (the direction indicated by the arrow Y in the Figs.), since the front magnetic pole member 8 is formed so as to have a narrower width than that of the yoke member 9, the magnetic flux generated by the application of a recording current to the conductive layer 4 can smoothly flow into the front magnetic pole member 8, whereby the recording efficiency can be improved.

Furthermore, since the yoke member 9 of the main magnetic pole layer 7 is formed on the flat surface 5*a* of the insulating layer 5, and the back end part of the yoke member 9 is formed on the flat surface 6*a* of the coupling magnetic layer 6, the yoke member 9 can be accurately formed by sputtering so as to have a predetermined film thickness, whereby the main magnetic pole layer 7 can be reliably coupled with the auxiliary magnetic pole layer 2.

In addition, since the auxiliary magnetic pole layer 2 is also used as the upper shield layer of the magnetoresistive head 11 reproducing information from the magnetic recording medium 17, a process for manufacturing the thin-film magnetic head 1 for perpendicular magnetic recording provided with the magnetoresistive head 11 can be simplified, whereby the characteristics of information reproduction from the magnetic recording medium 17 can be improved.

Figure 14:
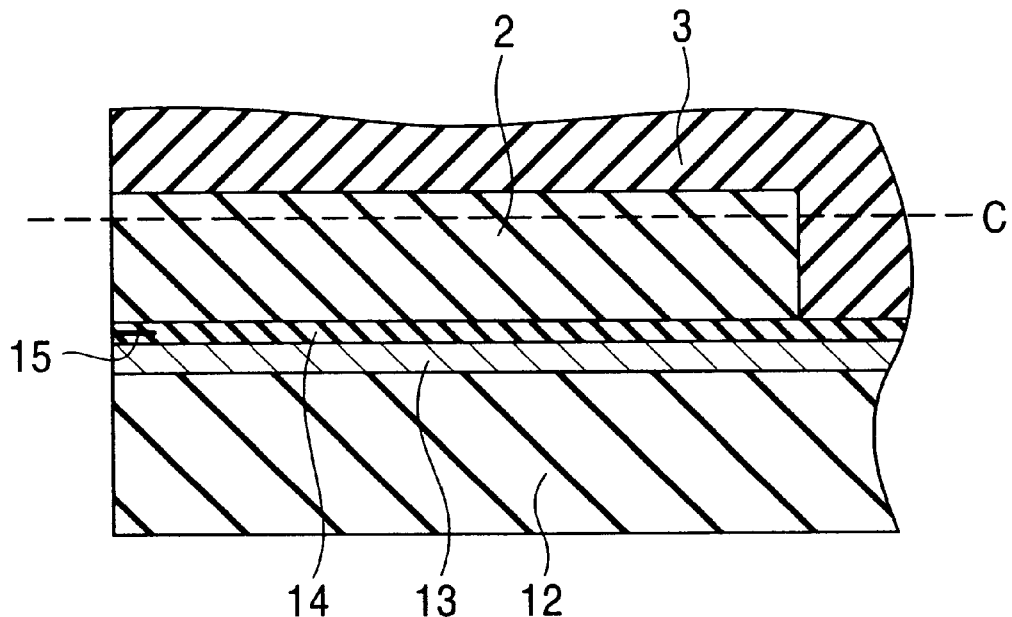
FIG. 14 is a cross-sectional view for illustrating a step in another method for manufacturing a thin-film magnetic head for perpendicular magnetic recording of the present invention showing a state in which an insulating layer is formed.
Figure 15:
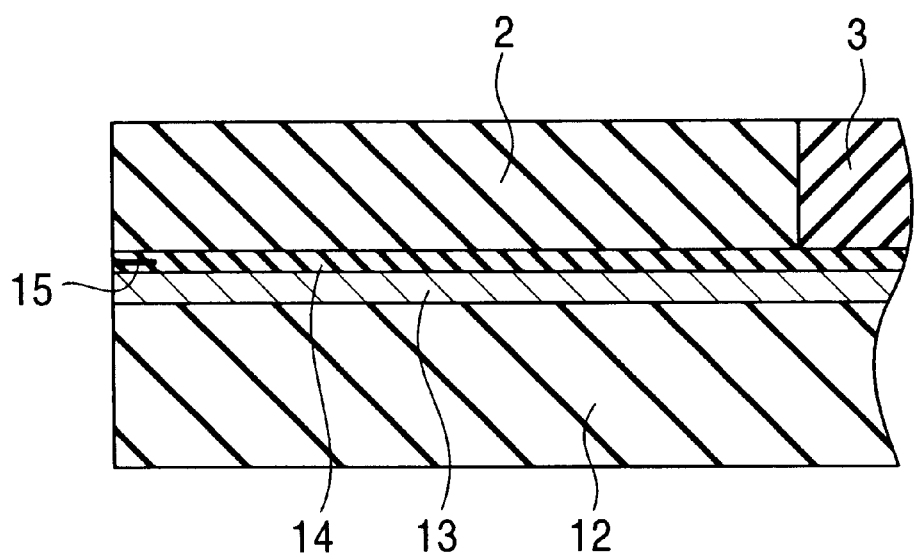
FIG. 15 is a cross-sectional view for illustrating a step in another method for manufacturing a thin-film magnetic head for perpendicular magnetic recording of the present invention showing a state in which an auxiliary magnetic pole layer and an insulating layer are planarized.
Figure 16:
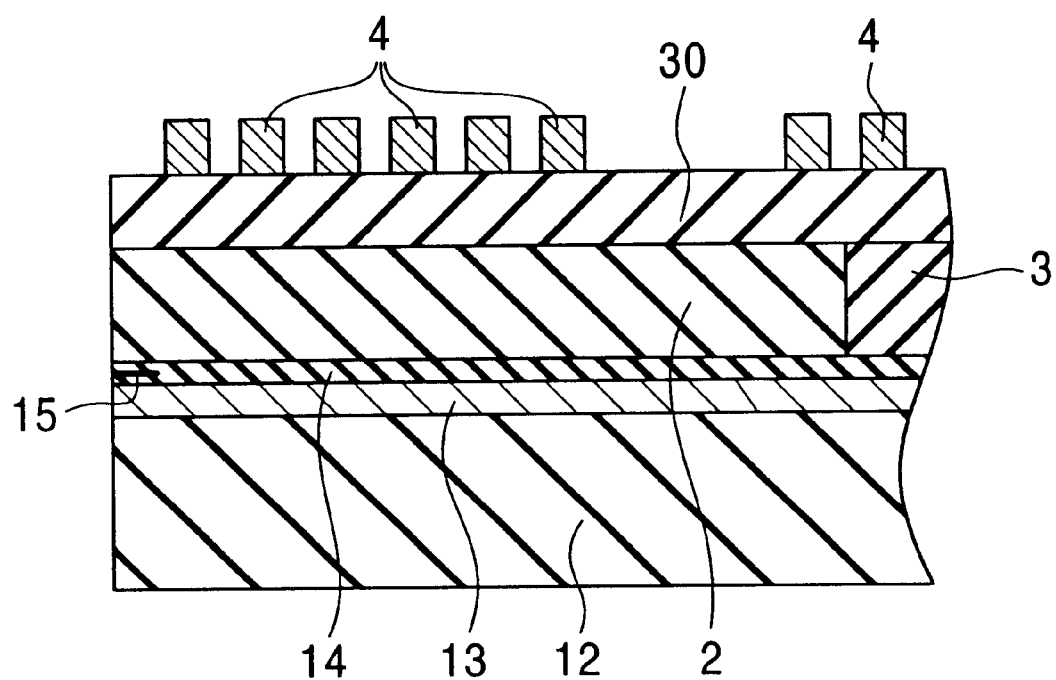
FIG. 16 is a cross-sectional view for illustrating a step in another method for manufacturing a thin-film magnetic head for perpendicular magnetic recording of the present invention showing a state in which a conductive coil layer is formed on an insulating layer.
Figure 17:
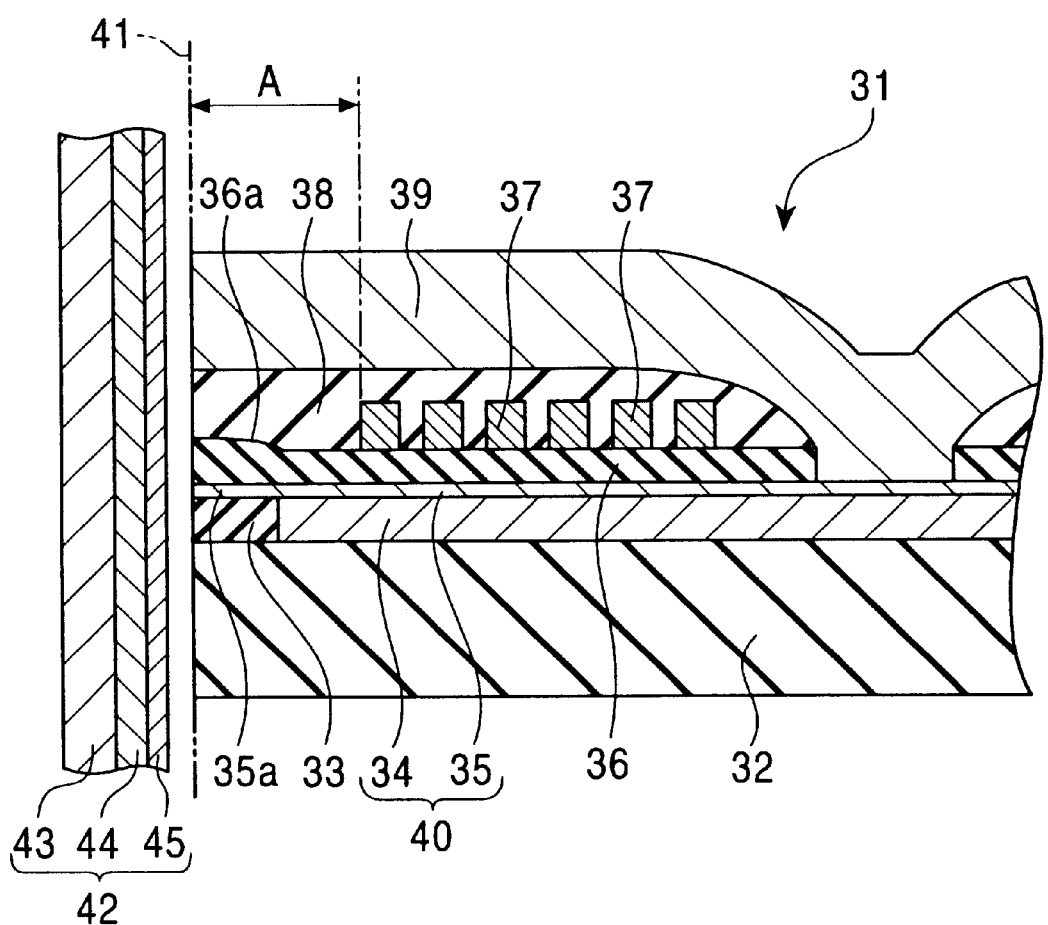
FIG. 17 is a cross-sectional view of a conventional thin-film magnetic head for perpendicular magnetic recording.
Figure 18:
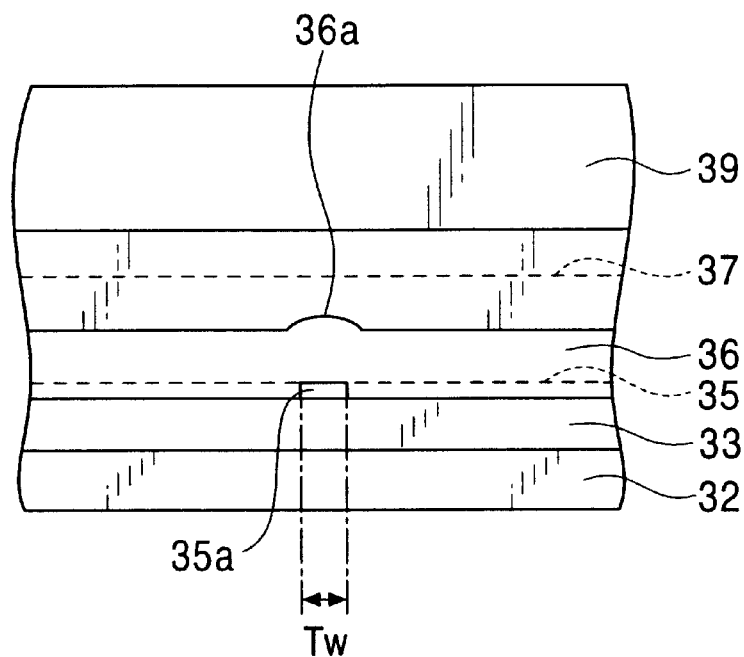
FIG. 18 is a front view showing an important portion of a conventional thin-film magnetic head for perpendicular magnetic recording, when viewed from a medium-opposing surface.
Figure 19:
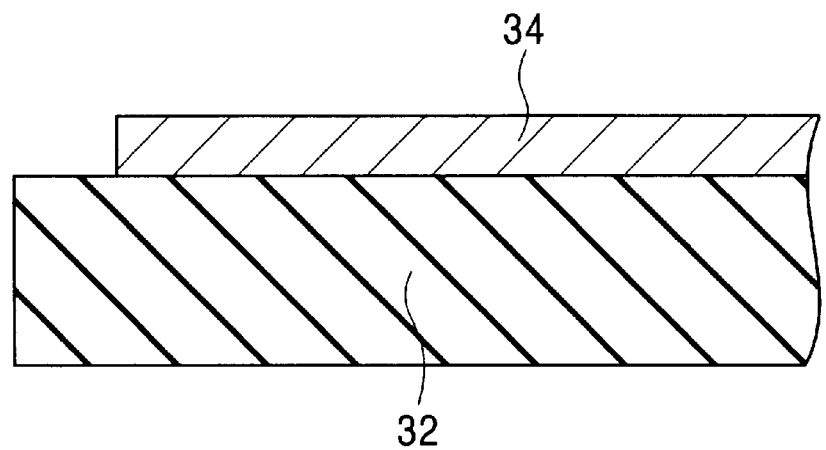
FIG. 19 is a cross-sectional view for illustrating a step in a method for manufacturing a conventional thin-film magnetic head for perpendicular magnetic recording showing a state in which a thick magnetic layer of a main magnetic pole layer is formed.
Figure 20:
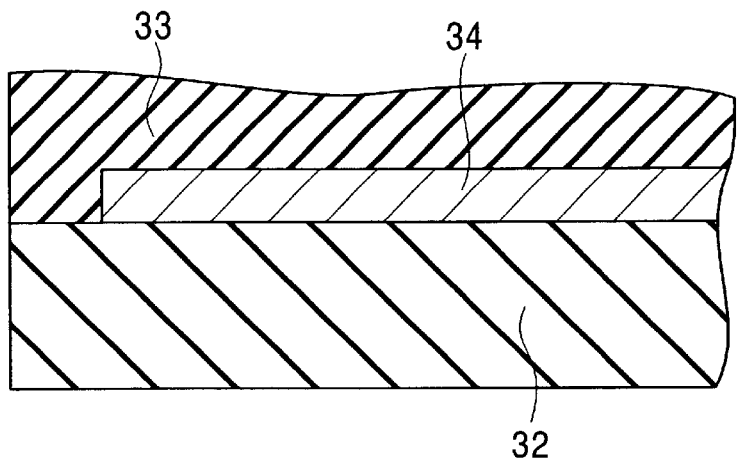
FIG. 20 is a cross-sectional view for illustrating a step in a method for manufacturing a conventional thin-film magnetic head for perpendicular magnetic recording showing a state in which a nonmagnetic layer is formed.
Figure 21:
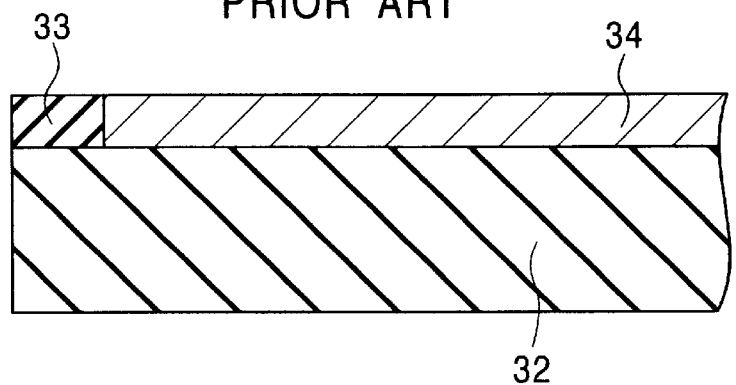
FIG. 21 is a cross-sectional view for illustrating a step in a method for manufacturing a conventional thin-film magnetic head for perpendicular magnetic recording showing a state in which a nonmagnetic layer and a thick magnetic layer are planarized.
Figure 22:
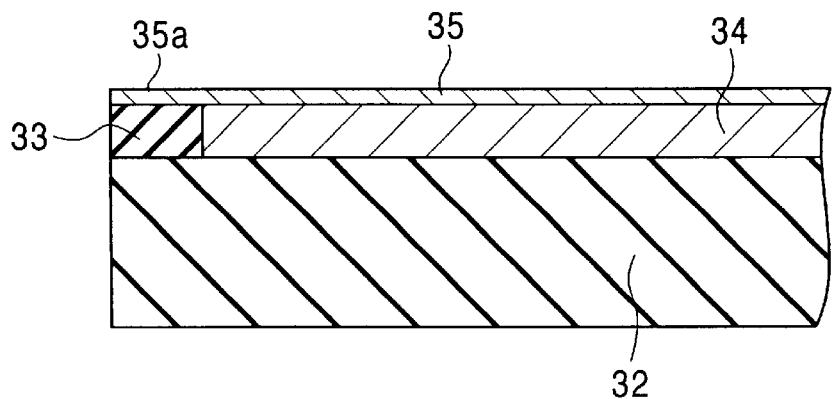
FIG. 22 is a cross-sectional view for illustrating a step in a method for manufacturing a conventional thin-film magnetic head for perpendicular magnetic recording showing a state in which a thin magnetic layer is formed.
Figure 23:
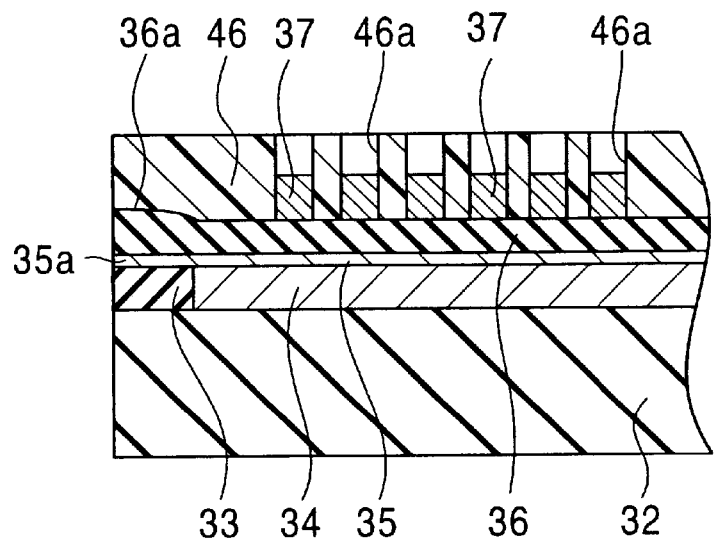
FIG. 23 is a cross-sectional view for illustrating a step in a method for manufacturing a conventional thin-film magnetic head for perpendicular magnetic recording showing a state in which a resist layer and a conductive coil layer are formed.
Figure 24:
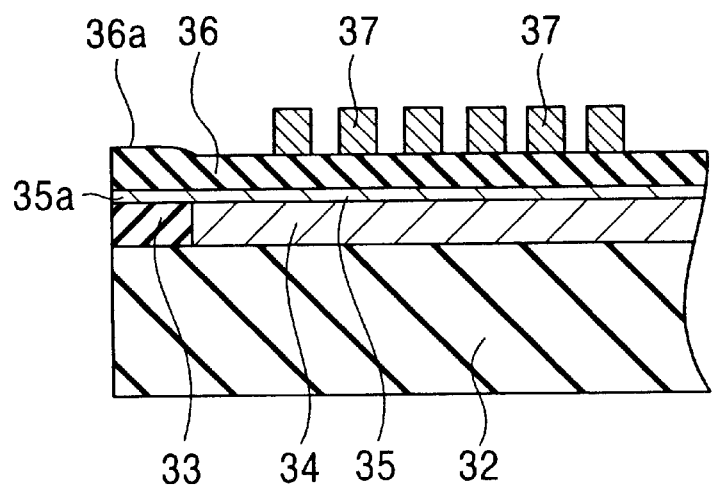
FIG. 24 is a cross-sectional view for illustrating a step in a method for manufacturing a conventional thin-film magnetic head for perpendicular magnetic recording showing a state in which a resist layer is removed.

In this embodiment, the case is described in which the insulating layer 3 is polished so as to remain on the auxiliary magnetic pole layer 2, and the conductive coil layer 4 is formed on the flat surface 3*a* of the insulating layer 3 thus formed. However, in consideration of variations in polishing accuracy of a CMP method, a process may be employed in which the auxiliary magnetic pole layer 2 is formed so as to have a slightly larger thickness, the auxiliary magnetic pole layer 2 and the insulating layer 3 are polished to the dashed line C shown in FIG. 14 within the acceptable range of variation so as to form the flat surfaces shown in FIG. 15. The conductive coil layer 4 is then formed above the flat surfaces thus obtained with an insulating layer 30 provided therebetween, and the pattern 3*b* described above is provided in this insulating layer 30 by an ion milling method.

Figure 13:
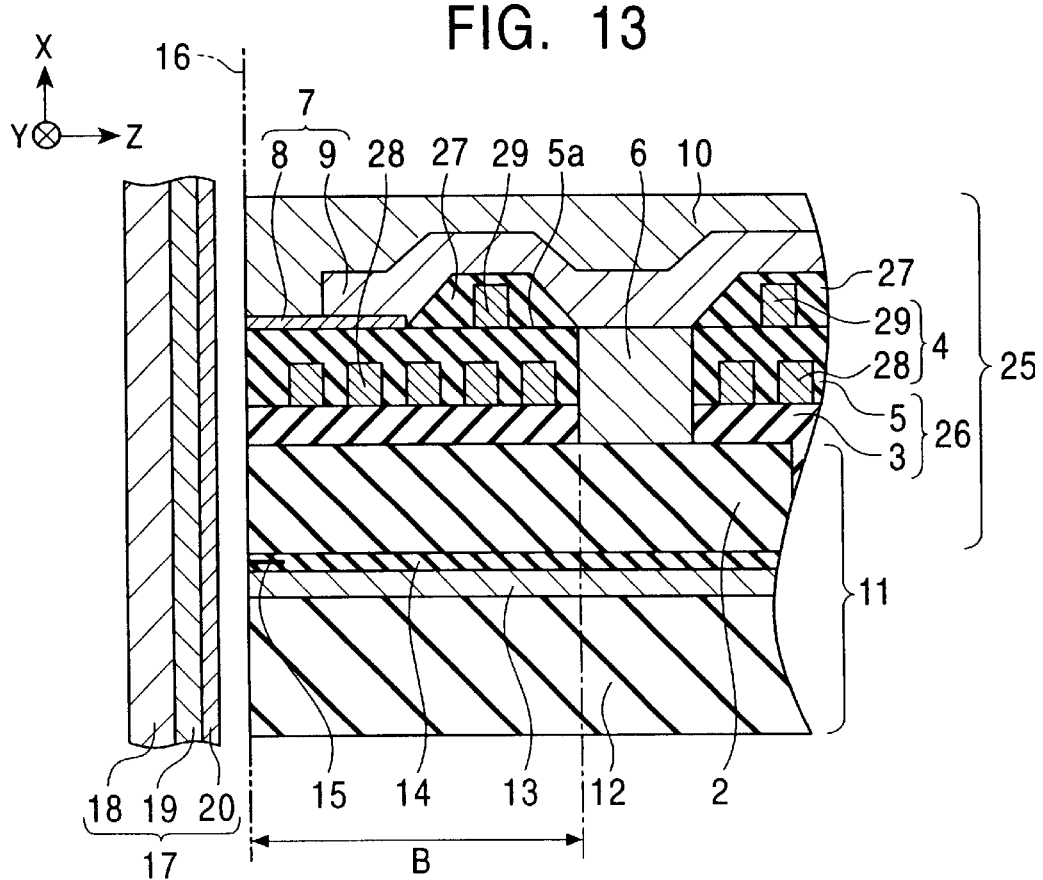
FIG. 13 is a cross-sectional view for illustrating an application of a thin-film magnetic head for perpendicular magnetic recording of the present invention.

FIG. 13 is a view showing another embodiment of the present invention, and the thin-film magnetic head 25 for perpendicular magnetic recording is equivalent to the thin-film magnetic head 1 for perpendicular magnetic recording except for the two points described below. The first point of difference is that a first insulating layer 26 is formed of insulating layers 3 and 5, a second insulating layer 27 composed of an organic insulating material such as a resist is formed on a flat surface 5*a* of the first insulating layer 26, and a yoke member 9 of a main magnetic pole layer 7 is formed so as to cover the second insulating layer 27. The second point of difference is that a conductive coil layer 4 is composed of a first coil member 28 penetrating the first insulating layer 26 and a second coil member 29, which is formed on the flat surface 5*a* and is connected to a wire extending from the center of the first coil member 28, penetrating the second insulating layer 27, and hence, without changing the turn winding of the conductive coil layer 4, distance B between a medium-opposing surface 16 and a coupling magnetic layer 6 is decreased from that of the thin-film magnetic head 1 for perpendicular magnetic recording.

In the thin-film magnetic head 25 for perpendicular magnetic recording thus formed, since the conductive coil layer 4 is electrically insulated from the main magnetic pole layer 7 and an auxiliary magnetic pole layer 2 by the insulating layer composed of the first and the second insulating layers 26 and 27, the second coil member 29 can be formed on the flat surface 5*a* of the first insulating layer 26 without damaging the cross-sectional shape and the intervals of the second coil member 29. In addition, since miniaturization of the magnetic circuit described above and reduction of the magnetic resistance can be achieved, the thin-film magnetic head 25 is suitably used for recording in shorter wavelength regions as compared to the thin-film magnetic head 1 for perpendicular magnetic recording.

The present invention may be carried out in accordance with the embodiments described above, and the advantages described below can be obtained.

According the present invention, the thin-film magnetic head for perpendicular magnetic recording comprises an auxiliary magnetic pole layer having a front end portion opposing a magnetic recording medium; a main magnetic pole layer, formed above the auxiliary magnetic pole layer, having a front end portion opposing the front end portion of the auxiliary magnetic with a spacing therebetween and having a back end portion magnetically coupled therewith so as to form a magnetic circuit together with the auxiliary magnetic pole layer; a conductive coil layer in a spiral shape, which is disposed between the main magnetic pole layer and the auxiliary magnetic pole layer so as to cross the magnetic circuit; and insulating layers electrically insulating the auxiliary magnetic pole layer and the main magnetic pole layer from the conductive coil layer; wherein at least one of the insulating layers has a flat surface at a side further from the auxiliary magnetic pole layer, the front end portion of the main magnetic pole layer is provided on the flat surface, and the conductive coil layer is disposed below the main magnetic pole layer so that a part of the conductive coil layer opposes the front portion of main magnetic pole layer. Accordingly, the main magnetic pole layer is not influenced by the polishing that must be performed before the conductive coil layer is formed, and hence, a main magnetic pole layer having a predetermined film thickness can always be formed. As a result, the amount of magnetic flux concentrated on the front portion of the main magnetic pole layer can be sufficiently ensured, and hence, information recording on the magnetic recording medium can be reliably performed. In addition, the distance between the conductive coil layer and the front end portion of the main magnetic pole layer is decreased so that the magnetic flux concentrated on the front end portion of the main magnetic pole layer can be sufficiently ensured, whereby the magnetic efficiency of the magnetic circuit can be improved.

In addition, the main magnetic pole layer described comprises a narrow front magnetic pole member constituting the front end portion; and a yoke member having a width larger than that of the front magnetic pole member, which is in contact with a back end part of the front magnetic pole member; wherein a back end part of the yoke member is magnetically coupled with the auxiliary magnetic pole layer. Accordingly, magnetic flux generated by the application of a recording current to the conductive coil layer can smoothly flow into the front end portion of the main magnetic pole layer, and hence the recording efficiency can be improved.

The thin-film magnetic head for perpendicular magnetic recording further comprises a coupling magnetic layer on the auxiliary magnetic pole layer, in which the back end part of the yoke member is formed on an upper surface of the coupling magnetic layer, the upper surface being flush with the flat surface, and the main magnetic pole layer is magnetically coupled with the auxiliary magnetic pole layer by the coupling magnetic layer. Accordingly, the main magnetic pole layer can be reliably coupled magnetically with the auxiliary magnetic pole layer.

In addition, at least one of the insulating layers comprises a first insulating layer having the flat surface, and a second insulating layer provided on the flat surface of the first insulating layer, and the conductive coil layer comprises a first coil member penetrating the first insulating layer, and a second coil member penetrating the second insulating layer, which is formed on the flat surface and is connected to a wire extending from the center of the first coil member. Accordingly, miniaturization of the magnetic circuit described above and reduction of the magnetic resistance can be achieved, whereby the thin-film magnetic head is suitably used for recording in short wavelength regions.

Furthermore, since the auxiliary magnetic pole layer is also used as an upper shield layer of a magnetoresistive head for reproducing information from the magnetic recording medium, the process for manufacturing the thin-film magnetic head for perpendicular magnetic recording provided with the magnetoresistive head can be simplified, and hence, the characteristics of information reproduction from the magnetic recording medium can be improved.

What is claimed is:

1. A thin-film magnetic head for perpendicular magnetic recording, comprising:

an auxiliary magnetic pole layer having a front end portion opposing a magnetic recording medium;

a main magnetic pole layer having a front end portion, and a yoke member in contact with a back end of the front end portion, said front end portion opposing the front end portion of the auxiliary magnetic pole layer with a spacing therebetween and magnetically coupled therewith so as to form a magnetic circuit, the front end portion of the main magnetic pole layer having a width that is narrower in a track width direction than that of the yoke;

a conductive coil layer; and insulating layers electrically insulating the auxiliary magnetic pole layer and the main magnetic pole layer from the conductive coil layer;

wherein at least one of the insulating surfaces has a flat surface, the front end portion of the main magnetic pole layer is provided on a flat surface, and a part of the conductive coil layer is disposed between the front end portion of the main magnetic pole layer and the auxiliary magnetic pole layer.

2. A thin-film magnetic head for perpendicular magnetic recording according to claim 1, further comprising a coupling magnetic layer formed on the auxiliary magnetic pole layer, wherein a-back end part of the yoke member is formed on an upper surface of the coupling magnetic layer, the upper surface being flush with the flat surface, and wherein the main magnetic pole layer is magnetically coupled with the auxiliary magnetic pole layer by the coupling magnetic layer.

3. A thin-film magnetic head for perpendicular magnetic recording, according to claim 2, wherein said conductive coil layer is formed in a spiral shape, wherein said at least one of the insulating layers comprises a first insulating layer having the flat surface, and a second insulating layer provided on the flat surface of the first insulating layer, and wherein the conductive coil layer comprises a first coil member penetrating the first insulating layer, and a second coil member, which is formed on the flat surface and is connected to a wire extending from the center of the first coil member, penetrating the second insulating layer.

4. A thin-film magnetic head for perpendicular magnetic recording, according to claim 1, further comprising a magnetoresistive head for reproducing information from the magnetic medium, wherein the auxiliary magnetic pole layer functions as an upper shield layer for the magnetoresistive head.

5. A thin-film magnetic head for perpendicular magnetic recording, comprising:

an auxiliary magnetic pole layer having a front end portion opposing a magnetic recording medium;

a main magnetic pole layer having a front end portion opposing the front end portion of the auxiliary magnetic pole layer with a spacing therebetween and having a back end portion magnetically coupled therewith so as to form a magnetic circuit, the front end portion having a width that is narrower in a track width direction than that of the back end portion;

a conductive coil layer formed in a spiral shape; and insulating layers electrically insulating the auxiliary magnetic pole layer and the main magnetic pole layer from the conductive coil layer;

and further comprising a coupling magnetic layer formed on the auxiliary magnetic pole layer;

wherein at least one of the insulating layers has a flat surface;

wherein the front end portion of the main magnetic pole layer is provided on the flat surface;

wherein a part of the conductive coil layer is disposed between the front end portion of the main magnetic pole layer and the auxiliary magnetic pole layer;

wherein the main magnetic pole layer comprises a narrow front magnetic pole member constituting the front end portion and a yoke member in contact with a back end part of the front magnetic pole member, the yoke member having a width larger than that of the front magnetic pole member;

wherein a back end part of the yoke member is magnetically coupled with the auxiliary magnetic pole layer;

wherein the back end part of the yoke member is formed on an upper surface of the coupling magnetic layer, the upper surface being flush with the flat surface;

wherein the main magnetic pole layer is magnetically coupled with the auxiliary magnetic pole layer by the coupling magnetic layer;

wherein said at least one of the insulating layers comprises a first insulating layer having the flat surface, and a second insulating layer provided on the flat surface of the first insulating layer; and wherein the conductive coil layer comprises a first coil member penetrating the first insulating layer, and a second coil member, which is formed on the flat surface and is connected to a wire extending form the center of the first coil member, penetrating the second insulating layer.

6. A thin-film magnetic head for perpendicular magnetic recording, according to claim 5, further comprising a magnetoresistive head for reproducing information from the magnetic medium, wherein the auxiliary magnetic pole layer functions as an upper shield layer for the magnetoresistive head.

7. A thin-film magnetic head for perpendicular magnetic recording, comprising:
- an auxiliary magnetic pole layer having a front end portion opposing a magnetic recording medium;
- a main magnetic pole layer having a front end portion opposing the front end portion of the auxiliary magnetic pole layer with a spacing therebetween and having a back end portion magnetically coupled therewith so as to form a magnetic circuit, the front end portion having a width that is narrower in a track width direction than that of the back end portion;
- a conductive coil layer; and
- insulating layers electrically insulating the auxiliary magnetic pole layer and the main magnetic pole layer from the conductive coil layer;
- wherein a surface of at least one insulating layer is flat, said flat surface being in contact with the conductive coil layer, and
- a part of the conductive coil layer is disposed between the front end portion of the main magnetic pole layer and the auxiliary magnetic pole layer.

* * * * *

UNITED STATES PATENT AND TRADEMARK OFFICE
CERTIFICATE OF CORRECTION

PATENT NO.    : 6,751,054 B2
DATED         : June 15, 2004
INVENTOR(S)   : Kiyoshi Sato et al.

It is certified that error appears in the above-identified patent and that said Letters Patent is hereby corrected as shown below:

Column 12,
Line 55, after "extending" delete "form" and substitute -- from -- in its place.

Signed and Sealed this

Seventh Day of June, 2005

JON W. DUDAS
*Director of the United States Patent and Trademark Office*